Sept. 23, 1958        F. C. HUND        2,852,979
INSPECTION MIRROR
Filed May 1, 1957
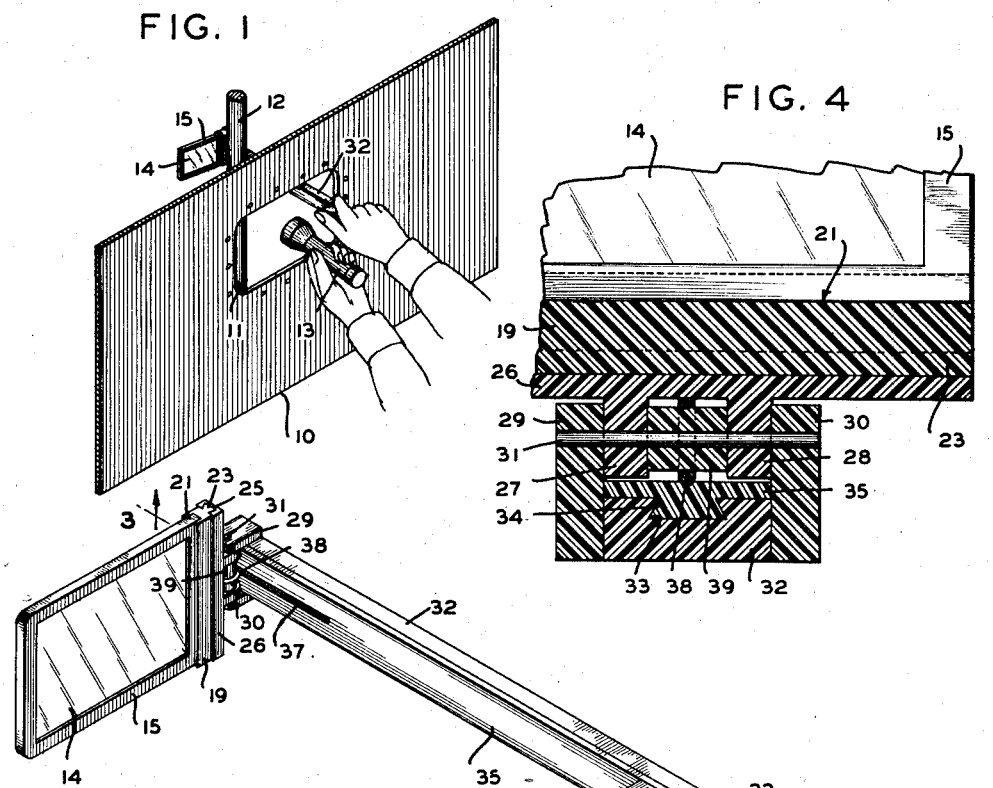
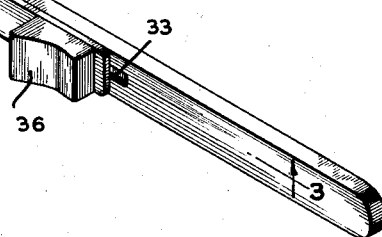
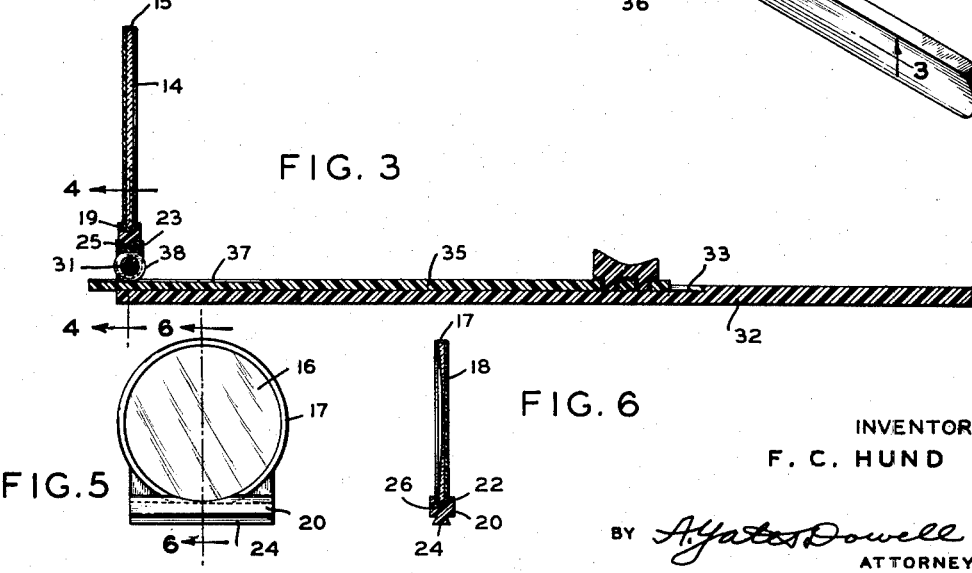
INVENTOR
F. C. HUND
BY *A. Yates Dowell*
ATTORNEY 2,852,979

INSPECTION MIRROR

Frank C. Hund, Nashville, Tenn., assignor of one-half to Warren H. Stevenson, Nashville, Tenn.

Application May 1, 1957, Serial No. 656,435

6 Claims. (Cl. 88—97)

This invention relates to the inspection and examination of various objects from various angles, particularly where accessibility is difficult, as where there is little clearance, the area desired to be inspected is under a low object behind a wall or the like or is permitted through a relatively small opening.

The invention relates particularly to inspection equipment mirrors specifically of the type which can be held in the hand, the mirror portion of which is at a substantial distance from the portion of the handle which is adapted to be gripped and the angularity of which mirror can be changed by the same hand and the mirror also can be used to reflect light onto the area inspected to thereby illuminate an area and facilitate inspection thereof.

It has been difficult to inspect without stooping certain areas such as those within openings of walls or panels including the wing of an airplane or the like or under a low object or other inaccessible locations.

It is an object of the invention to provide an inspection mirror having a handle, an angularly adjustable mirror thereon, and mechanism by which the mirror may be angularly adjusted by the hand in which the handle is held.

Another object of the invention is to provide an inspection mirror having a handle with a reciprocable slide and a pivoted mirror with a roller connection between the mirror and slide so that the mirror may be angularly adjustable by reciprocating the slide.

A further object of the invention is to provide an inspection mirror in a dielectric mounting of plastic or the like so that it will not form a good conductor for electricity and will therefore be useful in inspecting inaccessible spots in new type aircraft and subjected to high voltage.

A further object of the invention is to provide an inspection mirror including an elongated handle with a dovetail slide which engages a rubber wheel on a pivot by which the mirror is supported so that when the slide is moved the small rubber wheel will be engaged and the mirror rotated through an arc of 180°.

Other objects and advantages of the invention will be apparent from the following description taken in conjunction with the accompanying drawing wherein:

Fig. 1 is a fragmentary perspective showing one application of the invention;

Fig. 2, a perspective of one embodiment of the invention;

Fig. 3, a section taken on the line 3—3 of Fig. 2;

Fig. 4, a section taken on the line 4—4 of Fig. 3;

Fig. 5, a plan view of a magnifying mirror; and,

Fig. 6, a section taken on the line 6—6 of Fig. 5 showing the concave surface of the magnifying mirror.

Briefly stated this invention is a mirror, pivotally mounted on one end of a relatively long handle, the opposite end of which handle is adapted to be gripped in one hand and with a manipulating member and an associated slide which can be moved lengthwise of the handle to cause the mirror to pivot so that its angularity can be changed as desired, the change of motion from a straight line to rotational being accomplished by a rubber-like ring around the pivot of the mirror in contact with the surface of the slide so that as the slide is moved endwise it will frictionally engage the ring and rotate the pivot which carries the mirror.

With continued reference to the drawings the inspection mirror of the present invention is intended for viewing areas which are inaccessible or at least difficult to inspect as for example the rear side of a panel 10 which may be part of a wall such as the wing of an airplane or the like and having an inspection opening or window 11 for inspection of the rear face of the panel or of a strut 12. Due to the size of the window 11 access to the rear of the panel is difficult and the present invention contemplates the use of a flashlight 13 for illuminating a mirror 14 so that the light will be reflected therefrom onto the rear surface of the panel.

The mirror 14 may be rectangular and carried or supported in any desired manner as for example by a rectangular frame 15 or if preferred a circular mirror 16 may be used which may be a magnifying mirror if desired and have a backing 18. The mirror frames 15 and 17 may be carried in mounting strips 19 and 20 respectively the mounting strip 19 having a slot 21 and the mounting strip 20 having a slot 22 in which the frames 15 and 17 respectively are fixed with or without the use of adhesive.

Both of the mounting strips are straight and have on their backs dovetail tongues 23 and 24 by which they may be removably received in a dovetail slot 25 and 26 respectively of mirror mounting members one having on its back a pair of spaced ears or lugs 27 and 28 which fit between and are connected to corresponding lugs 29 and 30 by a pivot pin or hinge member 31, the lugs 29 and 30 being attached to an elongated handle 32 the remote end of which is adapted to be gripped in the using of the mirror. The handle preferably is composed of dielectric material such as plastic so that it will not prove a hazard where a substantial voltage is present as well as inflammables or explosives.

In order to cause the mirror to swing from a position substantially flat against the intermediate portion of the handle to a remote position through an arc and substantially 180° the handle is provided with a central undercut dovetail slot or groove 33 in which is received a dovetail tongue 34 of a slide 35 the slot or groove 33 has an open end adjacent the end of the handle 32 on which the mirror is mounted so that the slide can move along said slot for ease of manufacture although all that is necessary is that the slide move snugly along the handle and have means for retaining it in such relation to the handle.

On the end of the slide adjacent the portion of the handle adapted to be gripped is a manipulating member 36 having a concave top surface for easy engagement and endwise movement of the slide by the thumb of the operator. The slide 35 extends between the pivot pin 31 and the handle 32 and has a central longitudinal groove 37 in which is received the perimeter of a soft rubber ring or wheel 38 which encircles a portion of the hinge 39 fixed between the elements 27 and 28. Thus movement of the slide with the ring 38 and the groove 37 will cause rotation of the pivot portion 39 and the mirror 14 through its mounting.

It will be apparent from the foregoing that the present invention is relatively simple comprising principally a handle, a slide and a pivoted mirror with the slide engaging a rubber or a soft resilient ring on the pivot fixed to the mirror and by which construction the mirror may be swung and adjusted through an arc of 180°, It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An inspection mirror comprising a relatively long handle of dielectric material, a mirror transversely pivoted on one end of said handle the opposite end of which is adapted to be gripped, said handle having a dovetail lengthwise groove, a slide having a dovetail tongue slidable in said groove, said slide having a finger engaging portion by which it can be moved endwise, and a friction ring connected to the mounting pivot of said mirror and in contact with said slide whereby endwise movement of said slide will impart rotary motion to said mirror and vary the angle thereof.

2. An inspection mirror for use around high voltage electrical equipment comprising an elongated handle of dielectric material and an elongated slide disposed lengthwise of said handle for transmission of force from one end of said handle to the other, said handle being adapted to be gripped along one end and said slide engaged and moved lengthwise of said handle by the thumb, a mirror pivoted transversely on the opposite end portion of said handle with the pivot confining one end portion of said slide on said handle but permitting lengthwise movement thereof, and means including a friction roller on the mirror frictionally engaging said movable slide and forming a connection between said pivot and said slide so that when the latter is moved endwise it will cause rotary movement of said mirror.

3. An inspection mirror comprising a relatively long handle of electrically non-conductive material on the order of plastic, a mirror connected by a transverse hinge to said handle at one end portion of the latter, a strip mounted lengthwise on said handle and having an end remote from said mirror provided with an operating portion located in a position to be engaged and manipulated by the thumb when the handle is held in the hand and with said strip extending along said handle and held thereto beneath said hinge at the other end of said handle, and means including a friction roller on said mirror frictionally engaged by said strip for rotating said mirror by endwise movement of said strip.

4. An inspection mirror for use in connection with high voltage electrical equipment comprising an elongated handle of dielectric material having a gripping portion at one end, a mirror hinged to said handle at the opposite end, an elongated slide disposed lengthwise of said handle for endwise movement relative thereto and of a length corresponding substantially to the length of said handle for the transmisison of force from one end of said handle to the other end, said handle having a groove in which said slide is received, a friction roller attached to said mirror and engaging said slide whereby endwise movement of said slide will cause said mirror to swing about its hinge thereby changing its angularity.

5. The structure of claim 4 including a mounting for said mirror and releasable resilient means for retaining said mirror in said mounting.

6. An inspection mirror comprising an elongated handle, an elongated slide mounted lengthwise on said handle in a manner to be moved endwise to transmit motion from one end of said handle to the other, said handle being adapted to be gripped along one end so that the thumb may engage said slide in a manner to move it endwise, a mirror pivoted transversely on the end portion of said handle opposite that adapted to be gripped whereby the angularity of said mirror may be adjusted relative to said handle, a friction ring attached to and rotatable with said mirror, said ring being frictionally in contact with said slide so that when said slide is moved endwise it will cause said ring and the mirror to which it is connected to rotate.

References Cited in the file of this patent

UNITED STATES PATENTS

| 998,021 | Marcy | July 18, 1911 |
| 1,036,000 | Pease | Aug. 20, 1912 |
| 1,462,398 | Van Nostrand | July 17, 1923 |
| 1,907,314 | Baer | May 2, 1933 |
| 2,283,560 | Kretchmer | May 19, 1942 |